US011999598B2

(12) United States Patent
Larmonier et al.

(10) Patent No.: US 11,999,598 B2
(45) Date of Patent: Jun. 4, 2024

(54) CRANE DRIVE METHOD FOR SELECTING AND APPLYING A PREFERENTIAL LOAD CURVE ACCORDING TO THE INCLINATION OF A JIB STRUCTURAL ELEMENT

(71) Applicant: MANITOWOC CRANE GROUP FRANCE, Dardilly (FR)

(72) Inventors: Nicolas Larmonier, Lyons (FR); François Lemire, Soucieu en Jarrest (FR)

(73) Assignee: MANITOWOC CRANE GROUP FRANCE, Dardilly (FR)

( * ) Notice: Subject to any disclaimer, the term of this patent is extended or adjusted under 35 U.S.C. 154(b) by 0 days.

(21) Appl. No.: 17/858,973

(22) Filed: Jul. 6, 2022

(65) Prior Publication Data

US 2023/0008800 A1 Jan. 12, 2023

(30) Foreign Application Priority Data

Jul. 6, 2021 (FR) ...................................... 2107277

(51) Int. Cl.
*B66C 23/34* (2006.01)

(52) U.S. Cl.
CPC .................................. *B66C 23/342* (2013.01)

(58) Field of Classification Search
CPC ......... B66C 13/18; B66C 13/20; B66C 13/22; B66C 15/00; B66C 23/342; B66C 23/34; B66C 23/68; B66C 23/42
See application file for complete search history.

(56) References Cited

U.S. PATENT DOCUMENTS 3,767,061 A * 10/1973 Tax .......................... B66C 23/90 212/276
6,439,408 B1 * 8/2002 Aquino ................... B66C 13/54 212/300

(Continued)

FOREIGN PATENT DOCUMENTS

EP 1327601 A1 7/2003
EP 1775252 A1 4/2007

(Continued)

OTHER PUBLICATIONS

Search Report issued in connection with FR Pat. Appl. 21/07277, dated Mar. 18, 2022.

*Primary Examiner* — Michael R Mansen
*Assistant Examiner* — Juan J Campos, Jr.
(74) *Attorney, Agent, or Firm* — Cook Alex Ltd.

(57) ABSTRACT

A crane drive method is provided for selecting and applying a preferential load curve adapted to a work configuration of a crane having a mast supporting a luffing jib including at least one jib structural element. The method includes an inclination measurement step implementing a measurement of an actual inclination of the jib structural element with respect to a reference axis in the work configuration, a selection step implementing an automated selection of the preferential load curve according to the actual inclination of the jib structural element, the preferential load curve selected from among a plurality of load curves stored in a memory and calculated beforehand for several inclinations of the jib structural element, and a drive step implementing an application of the preferential load curve for maneuvers of lifting and moving a load along the luffing jib in the work configuration of the crane.

15 Claims, 2 Drawing Sheets

(56) References Cited

U.S. PATENT DOCUMENTS

| | | | | |
|---|---|---|---|---|
| 6,991,120 | B2 * | 1/2006 | Gaillard | B66C 23/348 212/292 |
| 2003/0127409 | A1 * | 7/2003 | Verchere | B66C 23/34 212/300 |
| 2017/0334687 | A1 * | 11/2017 | Wiest | B66C 13/16 |
| 2017/0369287 | A1 * | 12/2017 | Krupinski | B66C 23/905 |

FOREIGN PATENT DOCUMENTS

| | | | |
|---|---|---|---|
| WO | 2016128122 | A1 | 8/2016 |
| WO | 2016203165 | A1 | 12/2016 |

* cited by examiner

CRANE DRIVE METHOD FOR SELECTING AND APPLYING A PREFERENTIAL LOAD CURVE ACCORDING TO THE INCLINATION OF A JIB STRUCTURAL ELEMENT

FIELD

The invention relates to a crane drive method for selecting and applying a preferential load curve adapted to a work configuration of a crane. It also relates to a crane comprising a mast supporting a luffing jib and means for implementing such a crane drive method.

The invention finds a non-limiting application for a self-erecting crane with a luffing and foldable jib.

BACKGROUND

A known crane comprises a mast, generally of the foldable mast or telescopic mast type, supporting a luffing and foldable jib comprising jib structural elements articulated with each other. Such a self-erecting crane is configurable between a transport configuration in which the mast and the jib are joined or folded together or side-by-side, and at least one work configuration in which the mast is vertical and the jib is unfolded to allow carrying out maneuvers of lifting and moving a load along the jib.

This type crane can have several work configurations, including:

- a configuration in which the jib is completely unfolded (so that the jib offers its greatest length) and extends substantially horizontally,
- a configuration in which the jib is completely unfolded and is inclined with respect to the horizontal, in other words the jib is raised with respect to the horizontal, such a work configuration being called a reach-crane configuration, the inclination of the jib allowing setting the load closer or further away and thus avoiding at the same time mounting the crane too high;
- a configuration in which the jib is partially unfolded, with a jib tip in the stowed or unfolded position (so that the jib offers a reduced length) and extends substantially horizontally;
- a configuration in which the jib is partially unfolded, with a jib tip in the stowed or unfolded position, and is inclined with respect to the horizontal (in other words the jib is raised in reach-crane).

These configurations can also be associated with several heights of the jib with respect to the ground, also called height under hook.

Once the crane has been mounted, an assembler then selects a load curve adapted to the work configuration of the crane; it being noted that this load curve will depend on the work configuration of the crane, such as the length of the jib, the height of the jib, the inclination of the jib. Also, a mis-selection by the assembler of the load curve adapted to the actual work configuration of the crane could have serious consequences, such as a damage or even a breakdown of the lifting and handling device.

SUMMARY

The object of the present invention is to solve all or part of this drawback, by providing a solution for knowing at least partially the actual work configuration of the crane, and automatically deducing therefrom the load curve adapted to this actual work configuration.

Thus, the invention provides a crane drive method for selecting and applying a preferential load curve adapted to a work configuration of a crane, such a crane comprising a mast supporting a luffing jib comprising at least one jib structural element, this crane drive method implementing the following steps:

- an inclination measurement step implementing a measurement of an actual inclination of the jib structural element with respect to a reference axis in the work configuration, by means of an inclinometer mounted on this jib structural element;
- a selection step implementing an automated selection of the preferential load curve according to the actual inclination of the jib structural element, such a preferential load curve being selected from among a plurality of load curves stored in a memory and calculated beforehand for several inclinations of this jib structural element; and
- a drive step implementing an application of this preferential load curve for maneuvers of lifting and moving a load along the luffing jib in the work configuration of the crane.

Thus the invention suggests assessing the work configuration of the crane from a measurement of the inclination of at least one jib structural element, thus allowing apprehending whether the jib is horizontal or raised, and therefore allowing adapting the load curve according to such an inclination.

According to one variant, the jib structural element, the actual inclination of which is measured, is selected from:

- either a first jib structural element, forming a jib foot, which is articulated on the mast,
- either a second jib structural element which is articulated on the first jib structural element.

According to one feature, the luffing jib is foldable and comprises at least two jib structural elements articulated with each other, and wherein:

- the inclination measurement step implements a measurement of the actual inclinations of the two jib structural elements with respect to the reference axis in the work configuration, by means of inclinometers mounted on said two jib structural elements; and
- the selection step implements the automated selection of the preferential load curve according to the actual inclinations of these two jib structural elements, the preferential load curve being selected from among the plurality of load curves calculated beforehand for several inclinations of these two jib structural elements.

Such a solution is particularly advantageous since it bases the selection of the preferential load curve on the inclinations of two jib structural elements, thus allowing accessing to a greater number of work configurations of the crane, and in particular to work configurations in which the jib is partially unfolded.

According to one possibility, the two jib structural elements comprise a first jib structural element, forming a jib foot, which is articulated on the mast, and a second jib structural element articulated on the first jib structural element.

According to another possibility, the luffing jib comprises a third jib structural element, forming a jib tip, which is articulated on the second jib structural element and which is movable between two positions comprising a stowed position in which the third jib structural element is folded and pulled towards the second jib structural element, and a deployed position in which the third jib structural element is unfolded and extends in alignment the second jib structural element, wherein a position detection step implements a detection of the actual position of the third jib structural element among its two positions, and wherein the selection step implements the automated selection of the preferential load curve according to the actual inclinations of the two jib structural elements and the actual position of the third jib structural element, said preferential load curve being selected from among the plurality of load curves calculated beforehand for several inclinations of the two jib structural elements and for the two positions of the third jib structural element.

Thus, the selection of the preferential load curve is based on the inclinations of the two first jib structural elements, and also on the position of the third structural element forming the jib tip, which will allow accessing to even larger number of work configurations of the crane, and in particular to work configurations in which the jib tip is extended or stowed.

According to another possibility, the position detection step (to detect the actual position of the third jib structural element) is implemented by means of a detector selected from:

an inclinometer mounted on the third jib structural element, or a position or proximity sensor which is mounted on the second jib structural element or on the third jib structural element to detect the presence/absence of the third jib structural element in one of the two positions.

Thus, for this third jib structural element, it is possible to use an inclinometer (as for the two first jib structural elements), but alternatively it is possible to use a position or proximity sensor, since this third jib structural element is either in the deployed position or in the stowed position, with no intermediate position in the work configuration.

In a particular embodiment, the crane drive method further comprises a height measurement step implementing a measurement of an actual height of the luffing jib with respect to a ground in the work configuration, and wherein the selection step implements the automated selection of the preferential load curve according to the actual inclination of the jib structural element and the actual height of the luffing jib, said preferential load curve being selected from among the plurality of load curves calculated beforehand for several inclinations of said jib structural element and for several heights of the luffing jib.

Thus, the selection of the preferential load curve is also based on the actual height of the luffing jib (similar to the height under hook generally considered in the field of cranes), increasing the range of work configurations for the crane.

According to one possibility, the mast is a telescopic mast comprising mast structural elements telescopically mounted, and the height measurement step is performed by means of a sensor which measures a telescoping level between the mast structural elements.

In a particular embodiment, the selection step is carried out by a control/command system, said control/command system being connected to the memory storing the plurality of load curves and to maneuvering actuators of the crane to perform the drive step.

The invention also relates to a crane comprising a mast supporting a luffing jib comprising at least one jib structural element, such a crane further comprising:

an inclinometer mounted on the jib structural element for a measurement of the actual inclination of the jib structural element with respect to a reference axis in a work configuration;

a control/command system connected to the inclinometer and to a memory storing a plurality of load curves calculated beforehand for several inclinations of said jib structural element;

wherein this control/command system is configured to carry out an automated selection of a preferential load curve according to the actual inclination of the jib structural element, this preferential load curve being selected from among the plurality of load curves stored in memory; and this control/command system is connected to maneuvering actuators and is configured to drive maneuvers of lifting and moving a load along the luffing jib in the work configuration of the crane, by applying the preferential load curve.

According to one feature, the luffing jib is foldable and comprises at least two jib structural elements articulated with each other and on which are mounted respective inclinometers for measuring the actual inclinations of the two jib structural elements with respect to the reference axis in the work configuration, and the control/command system is configured to carry out the automated selection of the preferential load curve according to the actual inclinations of said two jib structural elements, said preferential load curve being selected from among the plurality of load curves calculated beforehand for several inclinations of said two jib structural elements.

According to another feature, the luffing jib comprises a third jib structural element, forming a jib tip, which is articulated on the second jib structural element and which is movable between two positions comprising a stowed position in which the third jib structural element is folded and pulled towards the second jib structural element, and a deployed position in which the third structural element jib is unfolded and extends in alignment the second jib structural element, wherein a detector is configured for a detection of an actual position of the third jib structural element among its two positions, and wherein the control/command system is configured to carry out the automated selection of the preferential load curve according to the actual inclinations of said two jib structural elements and the actual position of the third jib structural element, said preferential load curve being selected from among the plurality of load curves calculated beforehand for several inclinations of said two jib structural elements and for the two positions of the third jib structural element.

In a particular embodiment, the crane comprises a height measurement device for implementing a measurement of an actual height of the luffing jib with respect to a ground in the work configuration, and wherein the control/command system is configured to carry out the automated selection of the preferential load curve according to the actual inclination of the jib structural element and the actual height of the luffing jib, said preferential load curve being selected from among the plurality of load curves calculated beforehand for several inclinations of said jib structural element and for several heights of the luffing jib.

According to one feature, the mast is a telescopic mast comprising mast structural elements telescopically mounted, and the height measurement device comprises a sensor which measures a telescoping level between the mast structural elements.

Other height measurement devices are possible, such as a laser rangefinder, an ultrasonic rangefinder, a camera, etc.

BRIEF DESCRIPTION OF THE DRAWINGS

Other features and advantages of the present invention will appear on reading the detailed description hereinafter, of a non-limiting example of implementation, made with reference to the appended figures in which.

DESCRIPTION

Figure 1:
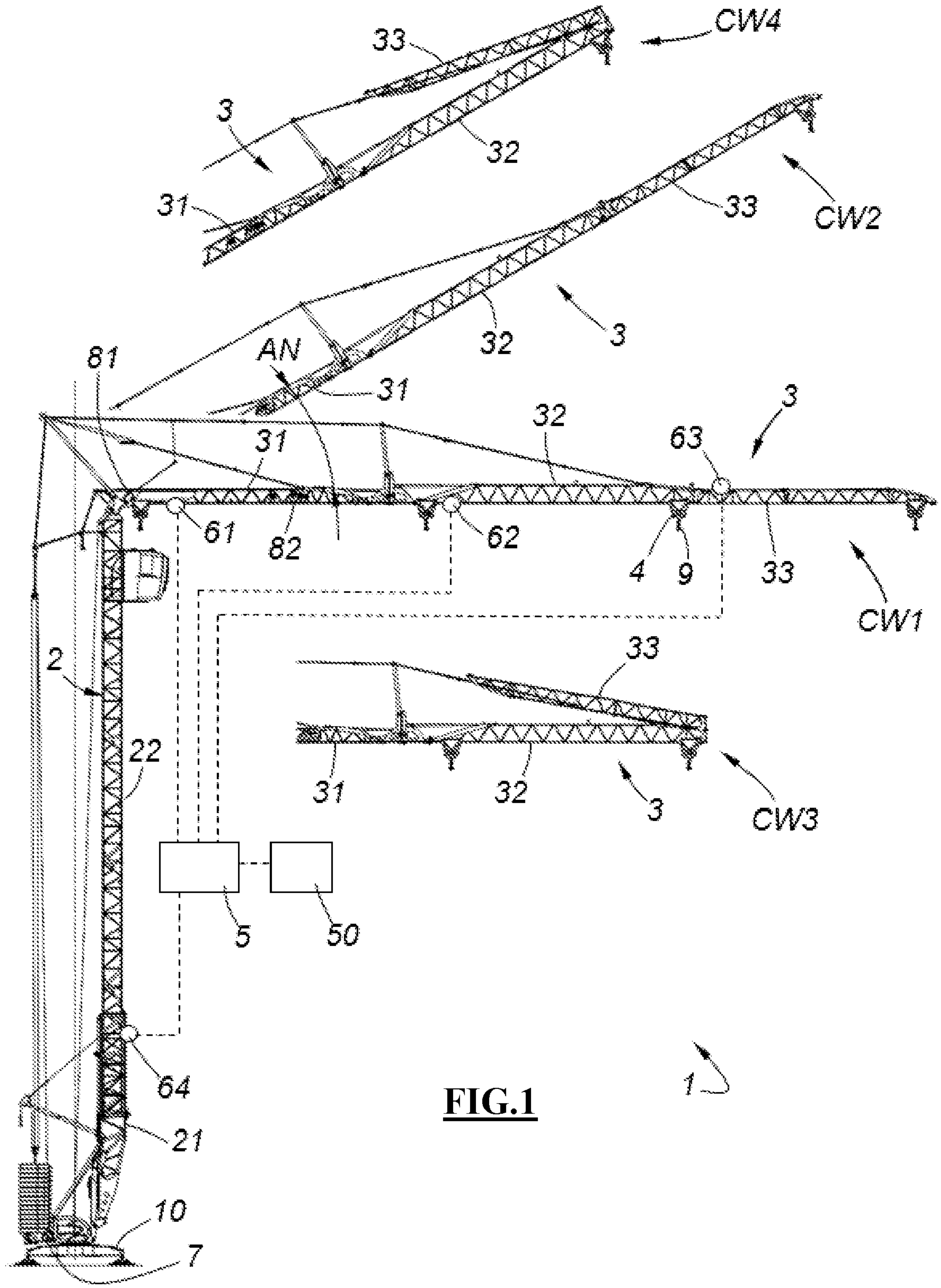
FIG. 1 is a schematic view of a crane in accordance with the invention, with an illustration of four distinct work configurations.

Referring to FIG. 1, a crane 1 according to the invention comprises a mast 2 mounted on a platform 10 and supporting a luffing jib 3. The mast 2 may be a foldable mast comprising mast elements articulated with each other, or be a telescopic mast comprising mast structural elements 21, 22 telescopically mounted as in the illustrated example. In turn, the luffing jib 3 is a foldable jib comprising jib structural elements 31, 32, 33 articulated with each other.

In the illustrated example, the luffing jib 3 comprises three successive jib structural elements 31, 32, 33, namely:

- a first jib structural element 31, forming a jib foot, which is articulated on the mast 2,
- a second jib structural element 32, forming a central element, articulated on the first jib element 31, and
- a third jib structural element 33, forming a jib tip, articulated on the second jib element 32.

The first jib structural element 31 and the second jib structural element 32 form the two first jib structural elements 31, 32.

The crane 1 is configurable in several work configurations comprising the following four work configurations CW1, CW2, CW3 and CW4 which are schematized in FIG. 1:

- a first work configuration CW1 in which the luffing jib 3 is horizontal and completely unfolded, with its jib structural elements 31, 32, 33 which are unfolded, to extend substantially horizontally, in other words along a horizontal axis;
- a second work configuration CW2 (or reach-crane configuration) in which the luffing jib 3 is raised and completely unfolded, with its jib structural elements 31, 32, 33 which are unfolded to extend along an axis inclined with respect to the horizontal at a given inclination angle AN;
- a third work configuration CW3 in which the luffing jib 3 is horizontal and partially unfolded, with its two first jib structural elements 31, 32 which are unfolded and which extend substantially horizontally, in other words along a horizontal axis, and with its third jib structural element 33 which is folded back above the second jib element 32;
- a fourth work configuration CW4 in which the luffing jib 3 is raised and partially unfolded, with its two first jib structural elements 31, 32 which are unfolded and which extend substantially along an axis inclined with respect to the horizontal at a given inclination angle AN, and with its third jib structural element 33 which is folded back above the second jib structural element 32.

In the third work configuration CW3 and in the fourth work configuration CW4, the third jib structural element 33 remains folded back, above the second jib structural element 32, which is advantageous for working with a shorter luffing jib 3, depending on the needs and local working conditions. In other words, the third jib structural element 33 is movable between two positions comprising:

- a stowed position (in the third work configuration CW3 and in the fourth work configuration CW4) in which the third jib structural element 33 is folded and pulled towards the second jib structural element, and
- a deployed position (in the first work configuration CW1 and in the second work configuration CW2) in which the third jib structural element 33 is unfolded and extends in alignment the second jib structural element 32.

In the different work configurations, the mast 2 is deployed, and more specifically the mast structural elements 21, 22 are unfolded (in the foldable mast version) or are deployed (in the telescopic mast version).

Furthermore, the crane 1 may be of the self-erecting crane type, and can thus also be configurable in a transport configuration CT (not illustrated) in which the mast 2 and the luffing jib 3 are joined together or side-by-side and extend horizontally, in order to form a transportable package, and more specifically in which the mast structural elements 21, 22 are folded on themselves (in the foldable mast version) or are retracted on themselves (in the telescopic mast version) and the jib structural elements 31, 32, 33 are folded both on themselves and on the mast structural elements 21, 22.

The crane 1 is thus equipped with a motor-driven folding/unfolding system 7 which is coupled to the mast 2 and to the luffing jib 3 to act on the mast 2 and on the luffing jib 3 to fold and unfold the crane 1 and thus make it switch from a work configuration to the transport configuration, and vice versa. In other words, this motor-driven folding/unfolding system 7 allows performing configuration change operations implementing kinematics of folding and unfolding the luffing jib 3, and, where appropriate of deploying and retracting the mast 2.

The crane 1 further comprises a control/command system 5 connected to maneuvering actuators (for example a hoisting winch 81 to lower/raise a hoisting hook 9, and a distribution winch 82 to move a distribution trolley 4 along the jib 3). This control/command system 5 is configured to drive maneuvers of lifting and moving a load along the luffing jib 3 in the work configuration of the crane 1, by controlling the maneuvering actuators 81, 82, according to drive commands exerted by a crane driver on a drive interface, and by applying a preferential load curve; such a preferential load curve defining maximum operating loads at the spans considered along the luffing jib 3. This control/command system 5 can for example be a microcontroller, a microprocessor, or an electronic control card.

According to the invention, the crane 1 comprises at least one inclinometer mounted on one of the jib structural elements 32, 32, 33 for measuring actual inclinations of this jib element with respect to a reference axis, such as a horizontal axis or a vertical axis. In the example illustrated in FIG. 1, the crane 1 comprises two inclinometers, namely a first inclinometer 61 and a second inclinometer 62, mounted on the first jib structural element 31 and the second jib structural element 32 respectively, for measuring the actual inclinations of this first jib element 31 and of this second jib element 32 respectively.

Figure 2:
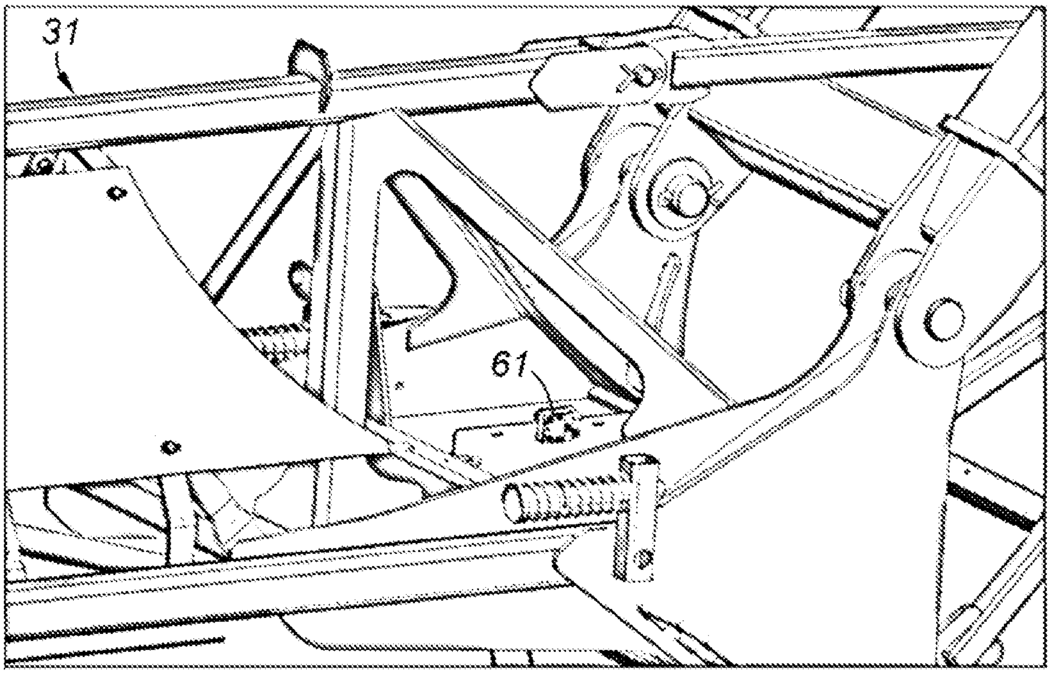
FIG. 2 is a partial schematic view of a first jib element, forming a jib foot, on which a first inclinometer is mounted.
Figure 3:
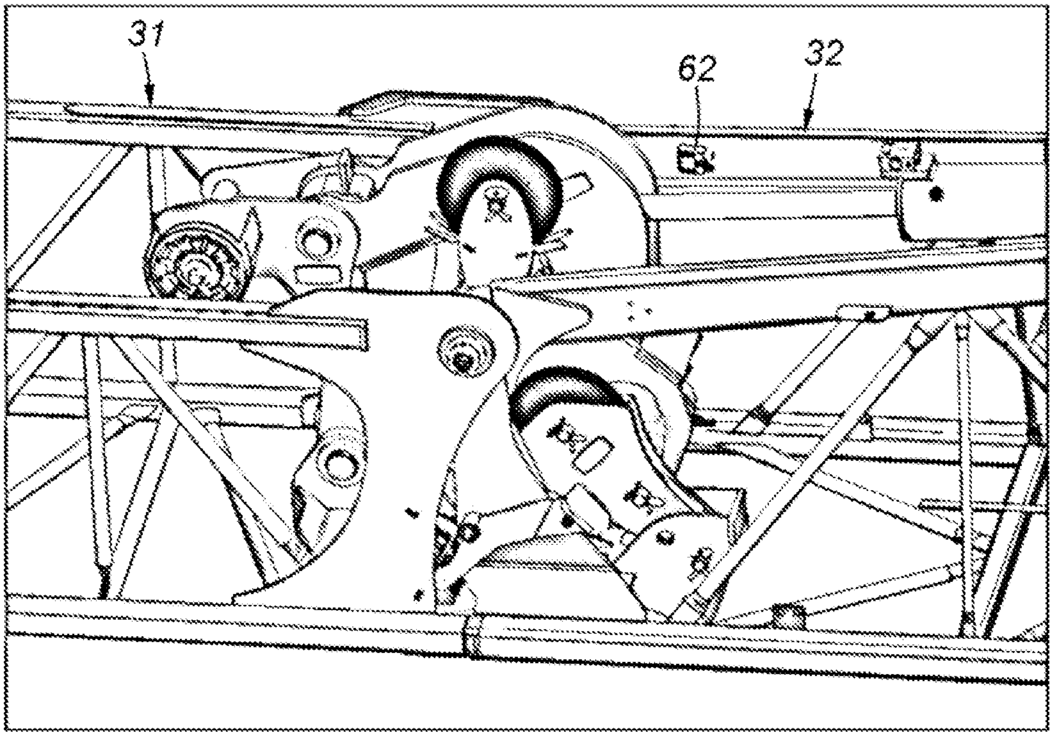
FIG. 3 is a partial schematic view of a second jib element on which a second inclinometer is mounted.

Referring to FIG. 2, the first inclinometer 61, fastened on the first jib structural element 31, may be placed proximate to the articulation of the first jib element 31 on the top of the mast. Referring to FIG. 3, the second inclinometer 62, fastened on the second jib structural element 32, may be placed proximate to the articulation between the second jib structural element 32 and the first jib structural element 31.

Each of the two inclinometers 61, 62 may be an inclinometer with absolute angular measurement with respect to the vertical or to the horizontal, depending on the model. The inclinometers 61, 62 may be sensors with a reduced size which are directly mounted in a protected location of the structure of each jib structural element 31, 32.

It is also possible to provide for a detector 63 which detects the actual position of the third jib structural element 33 from among its two positions (stowed position and deployed position). This detector 63 may be an inclinometer mounted on the third jib structural element 33, or alternatively a position or proximity sensor which is mounted on the second jib structural element 32 or on the third jib structural element 33 to detect the presence/absence of the third jib structural element 33 in one of the two positions.

As shown in FIG. 1, the control/command system 5 is connected to the two inclinometers 61, 62 and to a memory 50 storing a plurality of load curves calculated beforehand for several inclinations of the two first jib structural elements 31, 32. Thus, the control/command system 5 is configured to carry out an automated selection of a preferential load curve according to the actual inclinations of the two first jib structural elements 31, 32, the preferential load curve being selected from among the plurality of load curves stored in the memory 50.

Advantageously, the control/command system 5 is connected to the two inclinometers 61, 62 and also to the detector 63, and the memory 50 stores a plurality of load curves calculated beforehand for several inclinations of the two first jib structural elements 31, 32 and for the two positions of the third jib structural element 33. Thus, the control/command system 5 is configured to carry out an automated selection of a preferential load curve according to the actual inclinations of the two first jib structural elements 31, 32 and the actual position of the third jib structural element 33, the preferential load curve being selected from among the plurality of load curves stored in the memory 50.

Thus, the control/command system 5 selects the preferential load curve which is adapted to the work configuration of the crane 1; this work configuration being dependent on the actual inclinations of the two first jib structural elements 31, 32 and the actual position of the third jib structural element 33. The invention thus allows selecting and applying a preferential load curve adapted to the work configuration of the crane 1.

To enrich this adaptation, it is possible to provide a height sensor 64 which allows a measurement of an actual height of the luffing jib 3 with respect to the ground in its work configuration. In the context of a telescopic mast 2, this height sensor 64 may be a sensor which measures a telescoping level between the mast structural elements 21, 22. In this improved version, the control/command system 5 is connected to the two inclinometers 61, 62, possibly to the detector 63, and to the height sensor 64, and the memory 50 stores a plurality of load curves calculated beforehand for several inclinations of the two first jib structural elements 31, 32, for the two positions of the third jib structural element 33, and for several heights of the luffing jib 3. Thus, the control/command system 5 is configured to carry out an automated selection of a preferential load curve according to the actual inclinations of the two first jib structural elements 31, 32, the actual position of the third jib structural element 33 and the actual height of the luffing jib 3, the preferential load curve being selected from among the plurality of load curves stored in the memory 50.

Thus, the control/command system 5 recovers measurement data from the different sensors 61, 62, 63, 64, and automatically applies the preferential load curve which is adapted to the work configuration deduced from these measurement data.

The invention claimed is:

1. A crane drive method for selecting and applying a preferential load curve adapted to a work configuration of a crane, said crane comprising a mast supporting a luffing jib comprising at least one jib structural element, said crane drive method implementing the following steps:

an inclination measurement step implementing a measurement of an actual inclination of the jib structural element with respect to a reference axis in the work configuration, by means of an inclinometer mounted on said jib structural element;

a selection step implementing an automated selection of the preferential load curve according to the actual inclination of said jib structural element, said preferential load curve being selected from among a plurality of load curves stored in a memory and calculated beforehand for several inclinations of said jib structural element;

a drive step implementing an application of said preferential load curve for maneuvers of lifting and moving a load along the luffing jib in the work configuration of the crane.

2. The crane drive method according to claim 1, wherein the luffing jib is foldable and comprises at least two jib structural elements articulated with each other, and wherein:

the inclination measurement step implements a measurement of the actual inclinations of the two jib structural elements with respect to the reference axis in the work configuration, by means of inclinometers mounted on said two jib structural elements; and the selection step implements the automated selection of the preferential load curve according to the actual inclinations of said two jib structural elements, said preferential load curve being selected from among the plurality of load curves calculated beforehand for several inclinations of said two jib structural elements.

3. The crane drive method according to claim 2, wherein the two jib structural elements comprise a first jib structural element, forming a jib foot, which is articulated on the mast, and a second jib structural element articulated on the first jib structural element.

4. The crane drive method according to claim 3, wherein the luffing jib comprises a third jib structural element, forming a jib tip, which is articulated on the second jib structural element and which is movable between two positions comprising a stowed position in which the third jib structural element is folded and pulled towards the second jib structural element, and a deployed position in which the third structural element jib is unfolded and extends in alignment the second jib structural element, wherein a position detection step implements a detection of the actual position of the third jib structural element among its two positions, and wherein the selection step implements the automated selection of the preferential load curve according to the actual inclinations of said two jib structural elements and the actual position of the third jib structural element, said preferential load curve being selected from among the plurality of load curves calculated beforehand for several inclinations of said two jib structural elements and for the two positions of the third jib structural element.

5. The crane drive method according to claim 4, wherein the position detection step is implemented by means of a detector selected from:

an inclinometer mounted on the third jib structural element, or a position or proximity sensor which is mounted on the second jib structural element or on the third jib structural element to detect the presence/absence of the third jib structural element in one of the two positions.

6. The crane drive method according to claim 1, comprising a height measurement step implementing a measurement of an actual height of the luffing jib with respect to a ground in the work configuration, and wherein the selection step implements the automated selection of the preferential load curve according to the actual inclination of the jib structural element and the actual height of the luffing jib, said preferential load curve being selected from among the plurality of load curves calculated beforehand for several inclinations of said jib structural element and for several heights of the luffing jib.

7. The crane drive method according to claim 6, wherein the mast is a telescopic mast comprising mast structural elements telescopically mounted, and the height measurement step is performed by means of a sensor which measures a telescoping level between the mast structural elements.

8. The crane drive method according to claim 1, wherein the selection step is carried out by a control/command system, said control/command system being connected to the memory storing the plurality of load curves and to maneuvering actuators of the crane to perform the drive step.

9. A crane comprising a mast supporting a luffing jib comprising at least one jib structural element, said crane further comprising:

an inclinometer mounted on said jib structural element for a measurement of the actual inclination of the jib structural element with respect to a reference axis in a work configuration;

a control/command system connected to the inclinometer and to a memory storing a plurality of load curves calculated beforehand for several inclinations of said jib structural element;

wherein said control/command system is configured to carry out an automated selection of a preferential load curve according to the actual inclination of said jib structural element, said preferential load curve being selected from among the plurality of load curves stored in said memory; and said control/command system is connected to maneuvering actuators and is configured to drive maneuvers of lifting and moving a load along the luffing jib in the work configuration of the crane, by applying said preferential load curve.

10. The crane according to claim 9, wherein the luffing jib is foldable and comprises at least two jib structural elements articulated with each other and on which are mounted respective inclinometers for measuring the actual inclinations of the two jib structural elements with respect to the reference axis in the work configuration, and wherein the control/command system is configured to carry out the automated selection of the preferential load curve according to the actual inclinations of said two jib structural elements, said preferential load curve being selected from among the plurality of load curves calculated beforehand for several inclinations of said two jib structural elements.

11. The crane according to claim 10, wherein the two jib structural elements comprise a first jib structural element, forming a jib foot, which is articulated on the mast, and a second jib structural element articulated on the first jib structural element.

12. The crane according to claim 11, wherein the luffing jib comprises a third jib structural element, forming a jib tip, which is articulated on the second jib structural element and which is movable between two positions comprising a stowed position in which the third jib structural element is folded and pulled towards the second jib structural element, and a deployed position in which the third structural element jib is unfolded and extends in alignment the second jib structural element, wherein a detector is configured for a detection of an actual position of the third jib structural element among its two positions, and wherein the control/command system is configured to carry out the automated selection of the preferential load curve according to the actual inclinations of said two jib structural elements and the actual position of the third jib structural element, said preferential load curve being selected from among the plurality of load curves calculated beforehand for several inclinations of said two jib structural elements and for the two positions of the third jib structural element.

13. The crane according to claim 12, wherein the detector is selected from:

an inclinometer mounted on the third jib structural element, or a position or proximity sensor which is mounted on the second jib structural element or on the third jib structural element to detect the presence/absence of the third jib structural element in one of the two positions.

14. The crane according to claim 9, comprising a height measurement device for implementing a measurement of an actual height of the luffing jib with respect to a ground in the work configuration, and wherein the control/command system is configured to carry out the automated selection of the preferential load curve according to the actual inclination of the jib structural element and the actual height of the luffing jib, said preferential load curve being selected from among the plurality of load curves calculated beforehand for several inclinations of said jib structural element and for several heights of the luffing jib.

15. The crane according to claim 14, wherein the mast is a telescopic mast comprising mast structural elements telescopically mounted, and the height measurement device comprises a sensor which measures a telescoping level between the mast structural elements.

* * * * *